United States Patent [19]

Brown et al.

[11] Patent Number: 5,033,814

[45] Date of Patent: Jul. 23, 1991

[54] LINE LIGHT SOURCE

[75] Inventors: Wendell D. Brown, Cupertino; William T. Glaser, San Jose, both of Calif.

[73] Assignee: Nilford Laboratories, Inc., Palo Alto, Calif.

[21] Appl. No.: 392,631

[22] Filed: Aug. 11, 1989

Related U.S. Application Data

[63] Continuation-in-part of Ser. No. 335,640, Apr. 10, 1989.

[51] Int. Cl.$^5$ .............................. G02B 6/04
[52] U.S. Cl. .................. 350/96.24; 350/96.25
[58] Field of Search ............... 350/96.24, 96.25

[56] References Cited

U.S. PATENT DOCUMENTS

| | | |
|---|---|---|
| 4,483,585 | 11/1984 | Takami . |
| 4,516,832 | 5/1985 | Jain et al. . |
| 4,523,805 | 6/1985 | Nagashima et al. . |
| 4,576,435 | 3/1986 | Nishioka ............ 350/96.24 |
| 4,577,926 | 3/1986 | Dewey et al. ........ 350/96.25 |
| 4,601,537 | 7/1986 | Saccocio . |
| 4,730,895 | 3/1988 | Siedband et al. ..... 350/96.24 |
| 4,758,064 | 7/1988 | Neefe . |
| 4,776,666 | 10/1988 | Kuehn et al. . |
| 4,812,012 | 3/1989 | Terada et al. . |
| 4,845,596 | 7/1989 | Mouissie ............. 350/96.24 |

FOREIGN PATENT DOCUMENTS 0301801 7/1988 European Pat. Off. .

OTHER PUBLICATIONS

Ohmura et al., "A New Type of PLZT Light Valve for an Image Projection," *1988 International Display Research Conference*. Jan. 1988.
Murano, et al., "A Video Projector using a PLZT Light Shutter Array", Jan. (1985), pp. 139–143, *Japanese Journal of Applied Physics*.
C. E. Baker of Texas Instruments, Inc., Dec. 1968, *IEEE Spectrum*.
Specification Sheet from Oriel Corporation, *Light Sources Monochromators Detection System*, vol. 2, p. 200, "Rectangular to Circular Fiber Optic Cable", (Copyright Jan. 1985).

*Primary Examiner*—William L. Sikes
*Assistant Examiner*—Robert E. Wise
*Attorney, Agent, or Firm*—Townsend and Townsend

[57] ABSTRACT

An apparatus for producing a pixel-modulated line light source from a point light source in which a fiber optic bundle formed of individual fibers arranged in a cylindrical array forming a tip at one end and having the individual fibers spread to a substantially flat line of fibers at the other end optically coupled with an optical shutter means which is constructed of an array of aperture cells disposd in a straight line region aligned with the flat line of fibers. The transmissivity of the aperture cells is individually controllable by electrical signals.

27 Claims, 6 Drawing Sheets

LINE LIGHT SOURCE

CROSS-REFERENCE TO RELATED APPLICATION

This application is a continuation-in-part of U.S. patent application Ser. No. 07/335,640 filed Apr. 10, 1989 entitled SCANNING IMAGE DISPLAY SYSTEM. The content of the prior application is incorporated herein by reference and made a part hereof.

BACKGROUND OF THE INVENTION

This invention relates to image display systems in which image elements are projected onto a display surface such as a projection screen, the display surface of a cathode ray tube or, with appropriate precautions, directly onto the retina of the human eye.

Most direct-view video projector display systems are based on cathode ray tube (CRT) technology in which a beam of electrons is directed to impinge on a phosphorescent screen. The resolution and brightness of CRT technology-based displays are inherently limited by the characteristics of phosphors and electron beam control electronics.

A projection system has been proposed using line scanning techniques, as distinct from electron pencil beam deflection techniques, as used in CRTs. An experimental video projector was described by Murano et al. entitled "A Video Projector Using a PLZT Light Shutter Array," *Japanese Journal of Applied Physics*, 24 (1985) *Supplement* 24-2, pp. 139-143. Therein a line PLZT light shutter array was used to modulate light from a xenon light source. The resulting modulated beam was scanned vertically by a movable mirror and then projected on the screen. However, this system experienced significant problems relating to brightness, uniformity of image, and scanning response time.

Laser illumination has been used in light scanning systems to illuminate a single pixel of image during a high-speed two-dimensional scan of a large projection screen system. A great deal of effort has been expended on achieving the objective using lasers because of their intense light and characteristic coherence. However, the use of lasers in wide spread commercial applications has been difficult to realize in practice for a number of reasons. Some of the difficulties have been discussed in a paper by C. E. Baker of Texas Instruments Inc., IEEE Spectrum, December 1968. One particular problem is the generally low efficiency of lasers, which results in unacceptably low picture brightness at large screen sizes for a given power consumption. An increase in laser output has involved an unacceptable increase in cost and complexity for all but the most cost-insensitive applications. Another problem involves the production of suitable red, blue and green light components for color displays. Consequently, systems employing multiple lasers have been required which results in increase in complexity and cost.

White light sources have been found to be more suitable for color projection than lasers because of the need for plurality of lasers to generate the desired colors. However, available light sources have the disadvantage of being less collimated and less coherent than a typical monochromatic laser. Thus, white light sources might be considered less suitable for spot scanning. A white light source requires relatively large components, including concentration lens, modulator and the like in order to achieve a brightness comparable to that of a laser. Large optical components are unwieldy and expensive. Moreover, large modulators are characterized by speed limitations, making them unsuitable for high-speed scanning systems. Finely-focused bright white light sources are difficult to achieve and hence, resolution is limited. Accordingly, it is desirable to provide a system which neither requires a laser nor the large and expensive optical components which have in the past generally been associated with a white light scanning system.

What is needed is a system for displaying an image from a sequence of intensity values representing pixels wherein the system is suitable for high volume, low cost production with a reliability acceptable for consumer applications of high resolution video imagery.

SUMMARY OF THE INVENTION

According to the invention, an apparatus is provided for producing a pixel-modulated line light source from a point light source in which a fiber optic bundle formed of individual fibers arranged in a cylindrical array forming a tip approximating a point at one end and having the individual fibers spread to a substantially flat line of fibers at the other end optically coupled with an optical shutter means which is constructed of an array of aperture cells disposed in a straight line region aligned with the flat line of fibers. The transmissivity of the aperture cells is individually controllable by electrical signals. Various fiber array structures are contemplated for use with shutters according to the invention, such as flat-ended structures, parallel fiber structures and focussing end structures.

The invention will be better understood by reference to the following detailed description in connection with the accompanying drawings.

DETAILED DESCRIPTION OF SPECIFIC EMBODIMENTS

Figure 1:
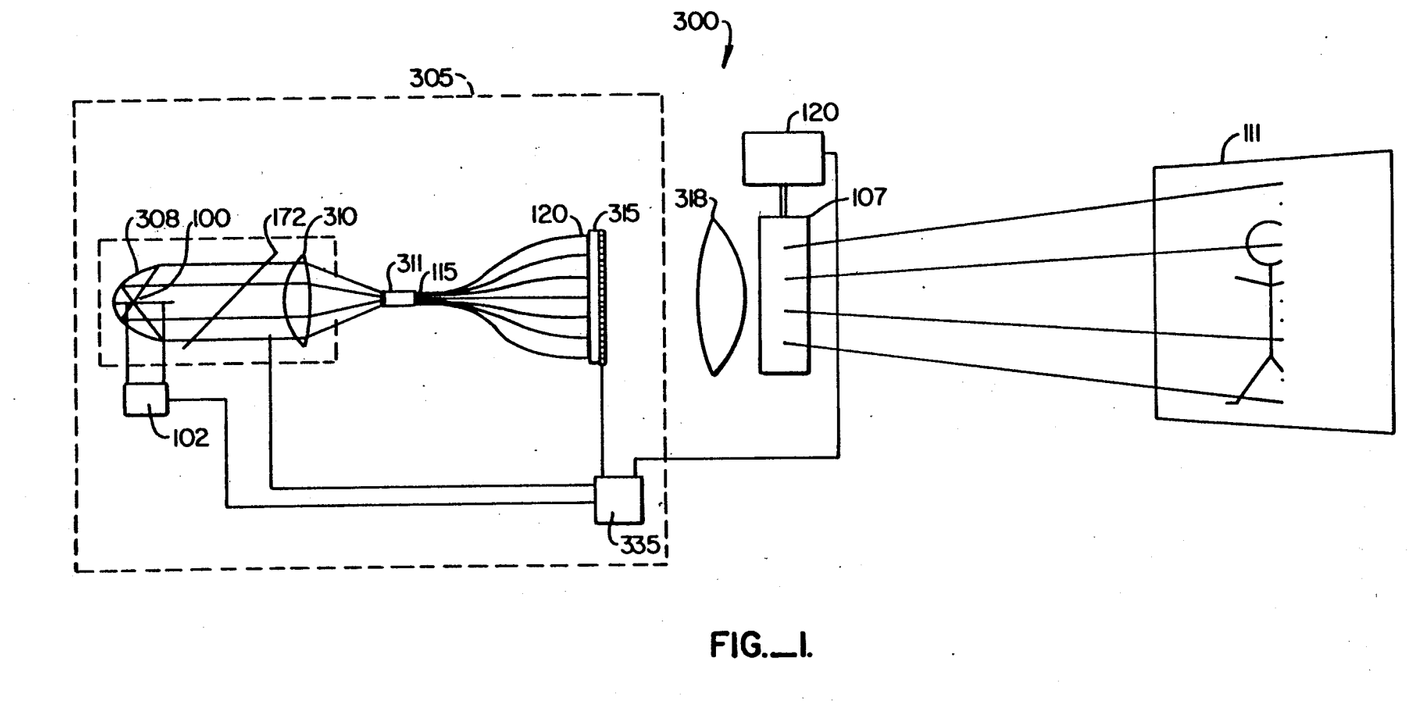
FIG. 1 is a schematic diagram illustrating a system incorporating the invention.

Referring now to FIG. 1, there is shown a block diagram of a first specific embodiment of a scanning image display system 300 according to the invention. A parabolic mirror 308 is employed to collimate the output energy of a point light source 100 at the focus of the mirror 308. A convex lens 310 captures and concentrates the output energy on a target comprising the flat tip of a clad fiber optic rod 311. The rod 311 is characterized by parallel outer walls having total internal reflection. The rod 311 may have a round or preferably hexagonal cross-section. The rod 311 abuts a first tip of a fiber optic bundle 115. The bundle 115 is, according to the invention, unfolded and spread into a flat line of fibers at a second tip 120 no more than a few fibers thick. The light outputs of the second tip 120 at the opposing end are directed to illuminate a line light shutter 315. The line light shutter 315 is for example a line array of PLZT modulator cells as explained herein operative under control of the control electronics 335 of the type disclosed in copending patent application Ser. No. 335,640 filed Apr. 10, 1989, referenced above. The output of the line light shutter 315 is directed through a projection lens 318 and a scanning mirror 107 to a screen 111 such that scanning according to the requirements of images on the screen 111 produces a desired image.

The control electronics 335 are coupled to the shutter 315 to control the transmissivity of the shutter 315. The shutter 315 may comprise a plurality of digital-to-analog converters coupled in an array to a voltage controlled light modulator. A suitable light modulator according to the invention is a PLZT modulator structure representing an improvement over PLZT-type modulators described in "Improved Hot-Pressed Electro-Optic Ceramics in the (Pb, La) (Zr, Ti) O₃ System," by G. H. Haertling, *Journal of the American Ceramics Society*, June 1971, Vol. 54, No. 6, p. 303.

Figure 2:
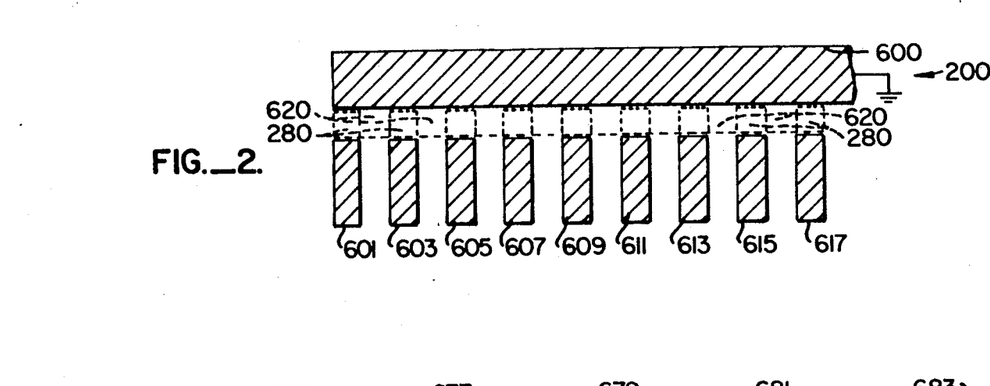
FIG. 2 is a top view depicting a first pattern of electrodes on one side of a substrate useful in accordance with the invention.
Figure 3:
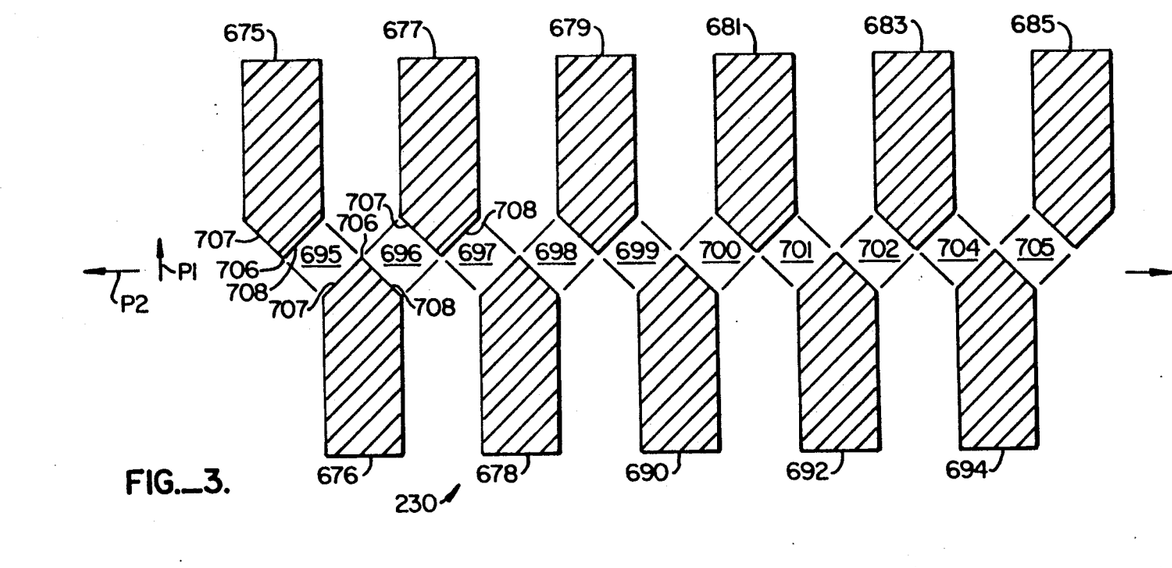
FIG. 3 is a top view depicting a second pattern of electrodes on one side of a substrate of a modulator according to the invention.

With reference to FIG. 2, there is shown a first embodiment of a pattern for a line light shutter 315 in accordance with a disclosure of the prior art of Murano et al. This line light shutter configuration can be used in a modulator system in accordance with the invention. The shutter is intended to be controlled by electrodes on a surface of a substrate defined by the patterns. The patterns are believed to be selected to avoid cross-talk and maximize resolution with minimal cost of manufacture. Conductors of predetermined rectilinear shape are laid or located on the surface of one side of a PLZT material or substrate in such a manner as to define modulator cells. (FIGS. 2 and 3 illustrate patterns without explicitly showing the substrate.) Typically, a voltage of approximately 150 volts is required to transform the PLZT material from opaque to transparent (i.e., to open or turn on a shutter of PLZT), approximately 100 volts results in a grey (partial transmission) and 0 volts results in the PLZT shutter being off (closed, no transmission). In FIG. 2, a pattern 200 has a bar conductor 600 which is juxtaposed across a cell region from a plurality of square-tipped finger conductors 601, 603, 605, 607, 609, 611, 613, 615, 617. The bar conductor 600 is coupled to ground or other common reference, and each of conductors 601, 603, 605, 607, etc., align with cell areas defined by position relative to the bar conductor 600 and thus form first individual PLZT shutter cells 280. The finger conductors 601, 603, etc. are coupled to corresponding amplifiers (not shown). Specifically, conductors 601, 603, 605, 607, etc. are driven at between 0 volts and 150 volts which causes the areas between bar conductor 600 and finger conductors 601, 603, 605, 607, etc. to act as shutter cells 280. A complementary pattern of conductors may be provided on the back side of the PLZT substrate or material to define second individual finger shutters 620 that interleave with shutter cells 280, resulting in a region, in the form of a row or line, of contiguous modulated shutters for controlling light (although this form is not shown in the Murano et al. reference). In one example, there may easily be provided 320 discrete and abutting shutters.

With reference to FIG. 3, there is illustrated a pattern 230 for an alternative embodiment to a shutter for a modulator 315. Herein, the pattern 230 incorporates cascaded electrodes. Specifically, electrodes 675, 677, 679, 681, 683, 685 are aligned on a first side and electrodes 676, 678, 690, 692, 694 are aligned on a second side of a row of cells 695, 696, 697, 698, 699, 700, 701, 702, 704, 705. Each electrode is provided with a bevelled tip 706 forming a first face 707 and a second face 708 such that a first face 707 of a first electrode is opposite a second face 708 of a second electrode, each electrode bordering on two adjacent cells. The adjacent faces 707 and 708 of a single electrode meet at an edge which is perpendicular and form thereby a line of shutter cells wherein fields between opposing electrode edges are oriented at forty-five degrees to the straight line of the cells and the long axis of the modulator area. Thus each electrode serves two cells. It is desirable that electric fields in the plane of the electrodes be oriented at forty-five degrees to the axis of polarization P1 or P2 of illumination directed through the cells. Since the process of polarization of light in a line light source, is most easily accomplished along axes which are either parallel or normal to the plane of the line light source, a cell arrangement wherein the fields are disposed at a forty-five degree orientation particularly simplifies construction of a modulator. The light can thus be modulated without specific attention to the sense of polarization, which allows for use of relatively flexible voltage control techniques.

For example, in illustration of this embodiment, assume that shutter cell 695 is on, shutter cell 696 is off, and electrode 675 is fixed to a ground. To turn shutter 695 on, electrode 676 is driven to 150 volts. To turn shutter cell 697 off, electrode 677 is driven to 150 volts. To turn shutter cell 697 on, electrode 678 is grounded. The electrode potentials are thus determined by the potential of the preceding electrode and the desired transmission of the corresponding shutter so that the drive potentials stay between −150 volts and +150 volts with the drive voltages being chosen so as to keep the voltage closest to 0.

This configuration has the advantage of providing closely-spaced shutter cells with electrodes on only a single side of the PLZT material.

Figure 4A:
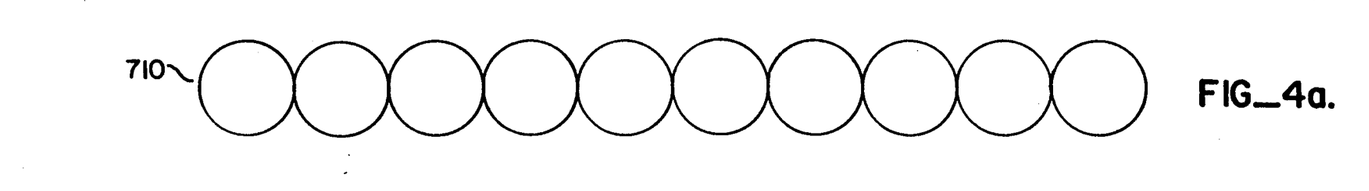
FIG. 4a is a first alternative embodiment for a fiber optic cable end according to the invention.
Figure 4B:
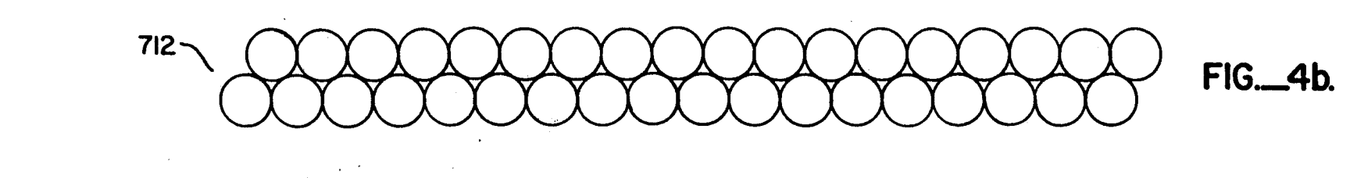
FIG. 4b is a second alternative embodiment for a fiber optic cable end according to the invention.
Figure 4C:
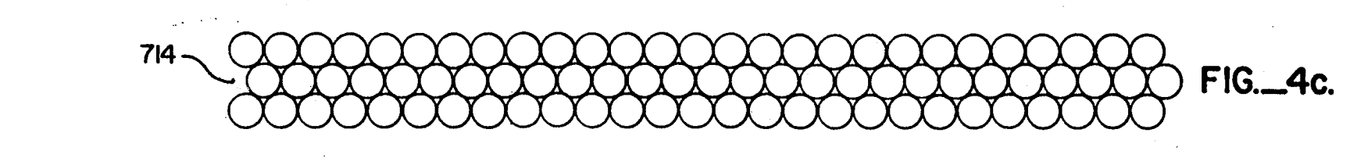
FIG. 4c is a third alternative embodiment for a fiber optic cable end according to the invention.
Figure 4D:
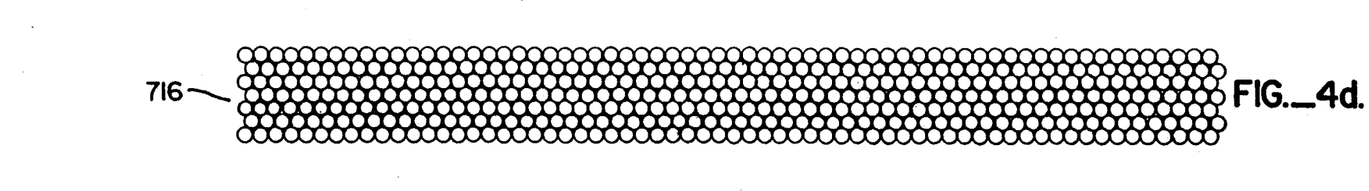
FIG. 4d is a fourth alternative embodiment for a fiber optic cable end according to the invention.
Figure 4E:
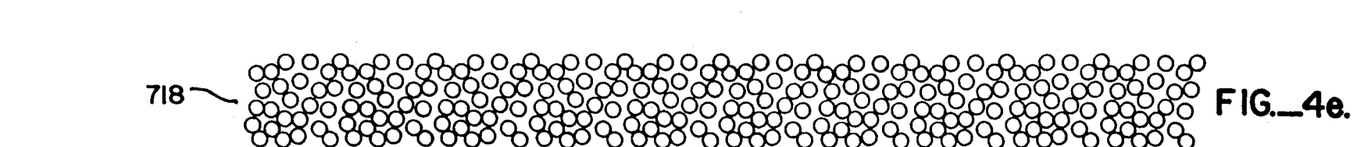
FIG. 4e is a fifth alternative embodiment for a fiber optic cable end according to the invention.
Figure 4F:
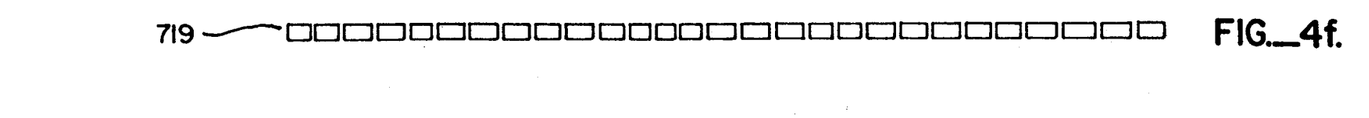
FIG. 4f is a fifth alternative embodiment for a fiber optic cable end according to the invention.

FIGS. 4a, 4b, 4c, 4d, 4e and 4f illustrate possible arrangements for fiber optic bundle ends in accordance with the invention. The precise arrangement of fiber ends is not critical to the illumination of individual pixels. FIG. 4a illustrates a bundle end 710 in which large diameter individual fibers or small diameter grouped fibers in a rope are aligned in a single row. FIG. 4b illustrates a bundle end 712 in which the fibers or fiber bundles are staggered in two rows. FIGS. 4c, 4d and 4e illustrate ends 714, 716 and 718 of ordered arrangements and a random arrangement. A random pattern has an advantage of maximum optical dispersion, which is useful in certain applications. FIG. 4f illustrates a row of fibers of rectilinear cross section, which is a particularly compact and efficient configuration for illumination according to the invention. Squared fibers may also be stacked as with other rectilinear section configurations.

Figure 5:
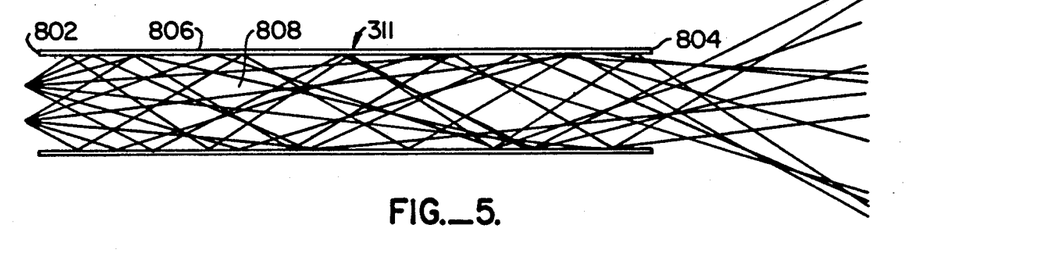
FIG. 5 is a side cross-sectional view of a light rod.

It is desirable that the illumination applied to the modulator be spatially randomized but angularly limited so that there is efficient light coupling into the fiber optic cable with relatively uniform illumination. One technique is illustrated in FIG. 5. A hollow rod 311, which is mounted as in FIG. 1 at the input end of the fiber optic cable, has an input end 802 and an output end 804 and is formed by a cylinder 806 whose inner surface is totally reflective. The input end 802 receives spatially ordered, angularly limited light from a source. Reflection in the core 808 of the rod causes the spatially-ordered light to randomize such that the emerging light is spatially randomized but still angularly limited.

The resolution of the described systems using linear arrays of shutters is fixed along the axis of the linear shutter or shutters but variable along the scanned axis. The resolution along the fixed axis is determined primarily by the total number of individual light shutters. Pixel acuity is determined by the shape, configuration, and masking of these individual pixels. The resolution along the scanned axis is variable and depends on several parameters. First, the width of the light shutters (the smaller of the two dimensions of the rectangular pattern) determines the total resolution of the display along the scanned axis. Decreasing the slot thickness thus increases resolution. However, this also decreases the brightness of the display.

Figure 6A:
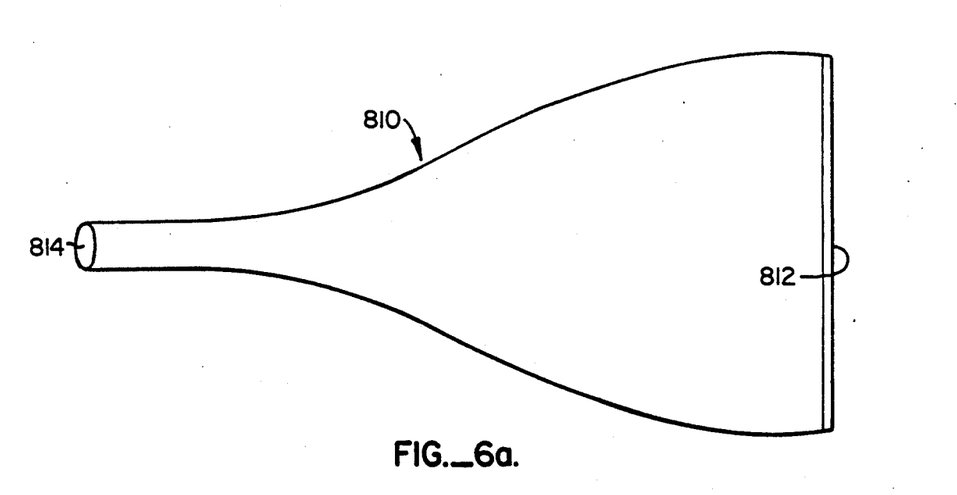
FIG. 6a is a top view and FIG. 6b is a side view of a first fiber optic bundle according to the invention.
Figure 6B:
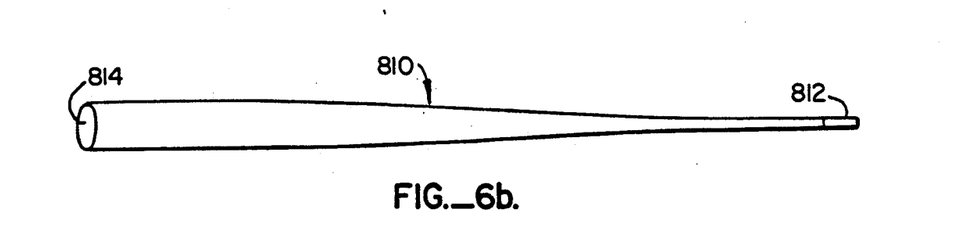

Various fiber optic elements are contemplated within the scope of the invention. The invention takes advantage of relatively low-cost, multi-mode fiber optic constructs. Such constructs possess a high core to cladding ratio, preferably greater than 90% core radius to cladding thickness. FIGS. 6a and 6b show a first fiber optic bundle 810 in top and side views illustrating a fully flattened output end 812 and a tubular input end 814. This is the most straight-forward fiber optic structure for transforming a beam of light into a single line of light. It is substantially more efficient than the cylindrical lens structures suggested in the prior art, such as in Murano et al.

Figure 7A:
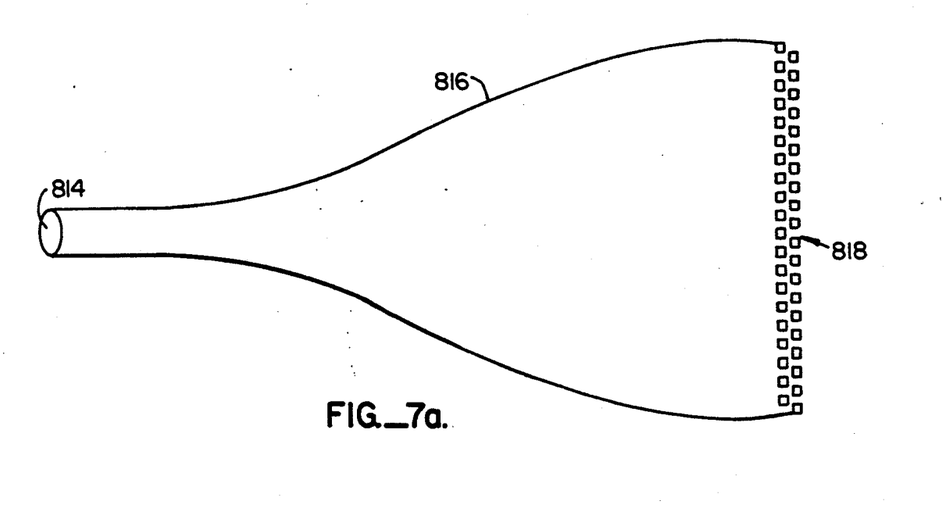
FIG. 7a is a top view and FIG. 7b is a side view of a second fiber optic bundle according to the invention.
Figure 7B:
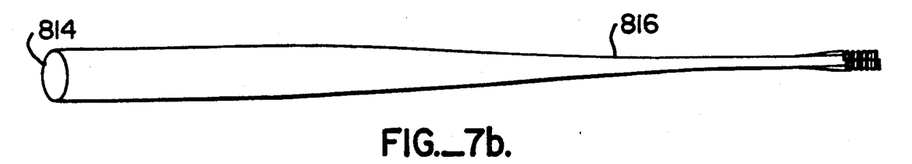

FIGS. 7a and 7b show a second fiber optic bundle 816 in top and side views illustrating a staggered termination in a flattened output end 818 with a tubular input end 814. This configuration is useful for shutter arrangements wherein cells are arranged in two lines with alternating position along a common axis. This is a structure whose function is impossible to duplicate with efficiency using lenses.

Figure 8A:
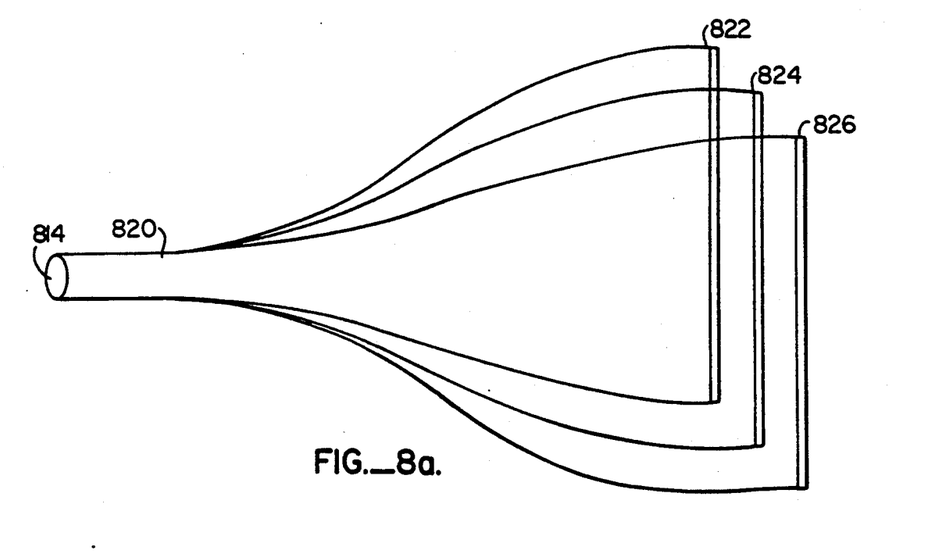
FIG. 8a is a top view and FIG. 8b is a side view of a third fiber optic bundle according to the invention.
Figure 8B:
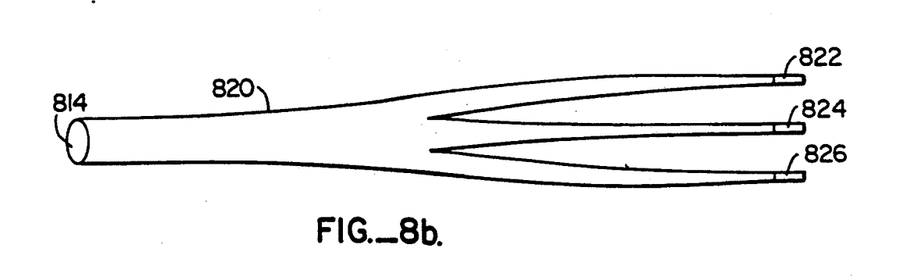

FIGS. 8a and 8b show a third fiber optic bundle 820 in top and side views illustrating a tubular input end 814 and an output end split into three fully flattened sheets 822, 824 and 826. Three straight line parallel shutter arrays can thereby be illuminated simultaneously. In such an alternative embodiment, parallel full resolution shutter arrays operating in timed relationship are used to couple the brightness with no loss of resolution. Moreover, it is possible to provide uniformity of the intensity of the pixel. If the pixel has concentrated intensity in a limited area the resolution can be increased. Further, with multiple parallel fiber optic structures of this type, it is possible to multiplex on the same pixel position, thereby increasing perceived switching speed of the light shutters, which can change perceived resolution. This does not contribute to full contrast resolution, but to small grey changes.

Figure 9:
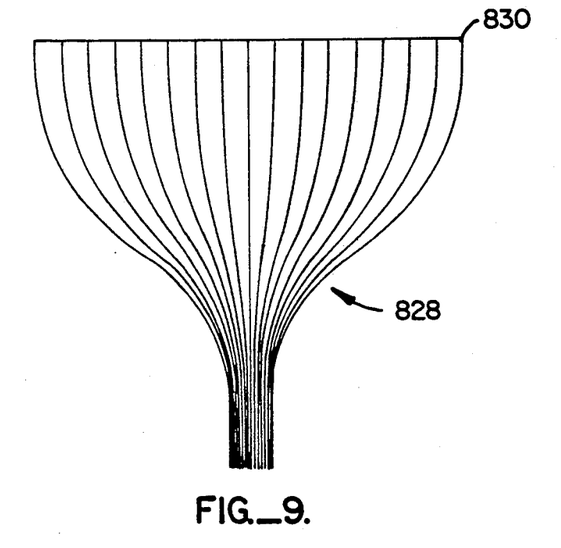
FIG. 9 is a top view of a fourth fiber optic bundle according to the invention.

FIG. 9 illustrates a fourth fiber optic bundle 828 wherein the output ends 830 of each individual fiber are arranged in a sheet and are parallel at the output end.

Figure 10:
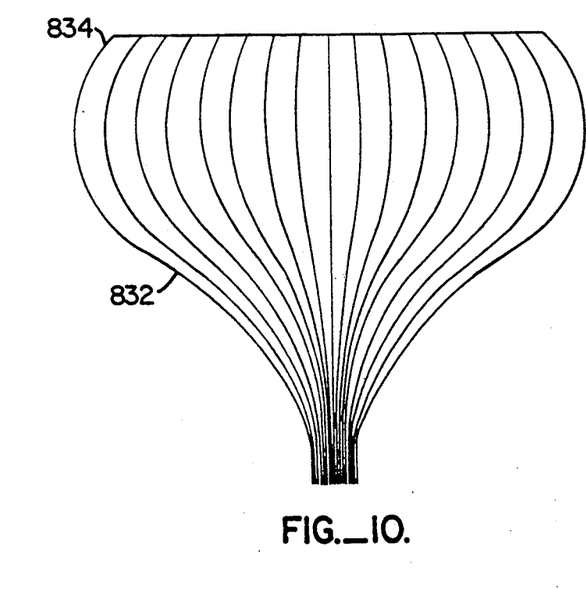
FIG. 10 is a top view of a fifth fiber optic bundle according to the invention.

FIG. 10 illustrates an alternative fifth fiber optic bundle 832 specifically limited to projection systems wherein the target length is less than the length of the line of shutters. Herein the output ends 834 are not parallel but instead are directed generally toward a point of convergence along a flat plane such that light passes through an aperture of minimal size. Such an arrangement has optical and structural advantages, since smaller and less expensive imaging elements may be employed.

Not shown, but within the contemplation of the present invention, is a color image scanning system wherein three beams of separate colors are combined into a single modulated beam and directed along a common light path.

The invention has now been described with reference to specific embodiments. Other embodiments will be apparent to those of ordinary skill in the art upon reference to this description. For example, although the illustrated embodiment shows the invention used in combination with a video signal, such as might be provided by a television receiver, the invention is suitable for the projection of any image by either synchronizing an image signal with a projection system or by storing a digitized representation of an image in a video buffer. Other light sources are also contemplated, such as a low-cost reliable CW laser, other point light sources with mirrors and lenses or the like. Still further, as an alternative to a moving scanning mirror, a moving refractor (prism), defractor (grating) or other electromagnetic or electro-optic deflection means could be used to deflect a scan. Still further, the entire image need not be buffered at any one time so long as the image buffer is large enough to accommodate the differing rates of input and output data streams. A buffer of appropriate size could be used in the event a linear vertical mirror is used or only unidirectional scans are invoked. Still further, a number of the advantages of the specific embodiments disclosed herein could be incorporated to advantage in a variety of scanning systems including cathode ray tube scanning systems and printer scanning systems. This invention is readily adapted and applied to displaying information from a first format in a second format which is time-base incompatible with the first format. Real-time image data buffering according to the invention enables the receiving display technology to control the nature of the display. Therefore, it is not intended that this invention be limited, except as indicated by the appended claims.

What is claimed is:

1. An apparatus for producing a pixel-modulated line light source from a point light source comprising:
   fiber optic bundle means formed of individual fibers having a first end and a second end, said first end having said individual fibers arranged in a cylindrical array forming a first tip and being disposed to intercept light impinging thereon, said second end having said individual fibers spread to an arrangement of a generally flat line of fibers, said second end being disposed to direct light through said fibers to an optical shutter means; and an optical shutter means, said optical shutter means comprising an array of aperture cells disposed in an aperture region juxtaposed to and substantially aligned with said flat line of fibers, wherein a common optical property of each one of said aperture cells is individually controllable by means of control signals.

2. The apparatus according to claim 1 wherein said point light source is an arc lamp.

3. The apparatus according to claim 1 wherein said point light source is a laser.

4. The apparatus according to claim 1 further including video signal generating means, said optical shutter means being coupled to said video signal generating means for responding to a video control signal.

5. The apparatus according to claim 1 further comprising means for projecting and variably deflecting said modulated light.

6. The apparatus according to claim 1 wherein said light directed through said fibers is imaged onto said optical shutter means by an imaging optic.

7. The apparatus according to claim 6 wherein said imaging optic is astigmatic.

8. The apparatus according to claim 1 further including:
rod means comprising an optically transmissive cylinder having a receiving end, a transmitting end and an inner wall, said inner wall being substantially totally internally reflective of light, said rod means being disposed to abut said first tip and aligned to receive impinging light from said point light source and to direct said impinging light into said first tip.

9. The apparatus according to claim 8, wherein said rod means is hollow.

10. The apparatus according to claim 8, wherein said receiving end is a lens.

11. The apparatus according to claim 8, wherein said rod means has a circular cross section.

12. The apparatus according to claim 8, wherein said rod means has a substantially flat cross section.

13. The apparatus according to claim 1, wherein said aperture cells are of a uniform size in the same order of magnitude as the cross section of one of said individual fibers.

14. The apparatus according to claim 1, wherein said aperture cells are disposed in one-to-one correspondence with individual ones one of said individual fibers.

15. The apparatus according to claim 1, wherein said aperture cells are of a uniform size and are larger than the cross section of one of said individual fibers.

16. The apparatus according to claim 1, wherein said array of aperture cells arranged in said aperture region are disposed having centers along a common line.

17. The apparatus according to claim 1, wherein said array of aperture cells arranged in said aperture region are disposed having centers along one of a plurality of parallel lines.

18. The apparatus according to claim 17, wherein adjacent aperture cells are disposed having centers along alternating ones of two parallel lines.

19. The apparatus according to claim 1, wherein said array of aperture cells comprise:
an optically active material forming a slab having a first face and a second face, said optically active material being responsive to an electric field to change birefringence, affecting polarization, for control of transmissivity in an orifice region between oppositely-polarized electrodes;

a first electrode associated with each one of said aperture cells, said first electrode having a first margin mounted to said substrate and juxtaposed to an orifice region of said one of said aperture cells; and a second electrode common to each one of said aperture cells, said second electrode having a second margin mounted to said substrate and juxtaposed to said orifice region of said one of said aperture cells opposing said first margin.

20. The apparatus according to claim 1, wherein said array of aperture cells comprise:
an optically active material forming a slab having a first face and a second face, said optically active material being responsive to an electric field to change birefringence, affecting polarization, for control of transmissivity in an orifice region between oppositely-charged electrodes;

a first electrode associated with each one of said aperture cells, said first electrode having a first margin mounted to said substrate and juxtaposed to an orifice region of said one of said aperture cells; and a second electrode associated with each one of said aperture cells, said second electrode having a second margin mounted to said substrate and juxtaposed to said orifice region of said one of said aperture cells opposing said first margin.

21. The apparatus according to claim 20, wherein said aperture cells are disposed having centers along a plurality of parallel lines within said aperture region such that no two aperture cells are adjacent one another on a common parallel line.

22. The apparatus according to claim 19, wherein said aperture region comprises two parallel lines of aperture cells.

23. An apparatus for producing a pixel-modulated line light source from a point light source comprising:
fiber optic bundle means formed of individual fibers having a first end and a second end, said first end having said individual fibers arranged in a cylindrical array forming a first tip and being disposed to intercept light impinging thereon, said second end having said individual fibers spread to an arrangement of a generally flat line of fibers, said second end being disposed to direct light through said fibers to an optical shutter means; and an optical shutter means, said optical shutter means comprising an array of aperture cells disposed in an aperture region juxtaposed to and substantially aligned with said flat line of fibers, wherein a common optical property of each one of said aperture cells is individually controllable by means of control signals, wherein said cells of said optical shutter means form a substantially straight line wherein electric fields between opposing electrode edges are oriented at forty-five degrees to the straight line of said cells such that each electrode serves two cells and said electric fields in the plane of the electrode are oriented at forty-five degrees to the axis of polarization P1 or P2 of illumination directed through the cells.

24. A fiber optic conduit for transmitting optical energy from a point source to a line target comprising:

a bundle of individual fibers having a first end and a second end, said first end having said individual fibers arranged in a cylindrical array forming a first tip approximating a point and being disposed to intercept light impinging thereon and originating from a point light source, said second end having said individual fibers spread to an arrangement of a substantially flat line of fibers aligned to direct optical energy through a lens aperture; and rod means comprising an optically transmissive cylinder having a receiving end, a transmitting end and an inner wall, said inner wall being substantially totally internally reflective of light, said rod means being disposed to abut said first tip and aligned to receive impinging light from said point light source and to direct said impinging light into said first tip, said receiving end forming a lens.

25. The apparatus according to claim 24, wherein said rod means has a substantially flat cross section.

26. The apparatus according to claim 24, wherein said rod means is hollow.

27. The apparatus according to claim 24, wherein said rod means has a circular cross section.

* * * * *